April 13, 1926.
J. STAGG
CAR WHEEL CONVEYING TRUCK
Filed May 28, 1925
1,580,698
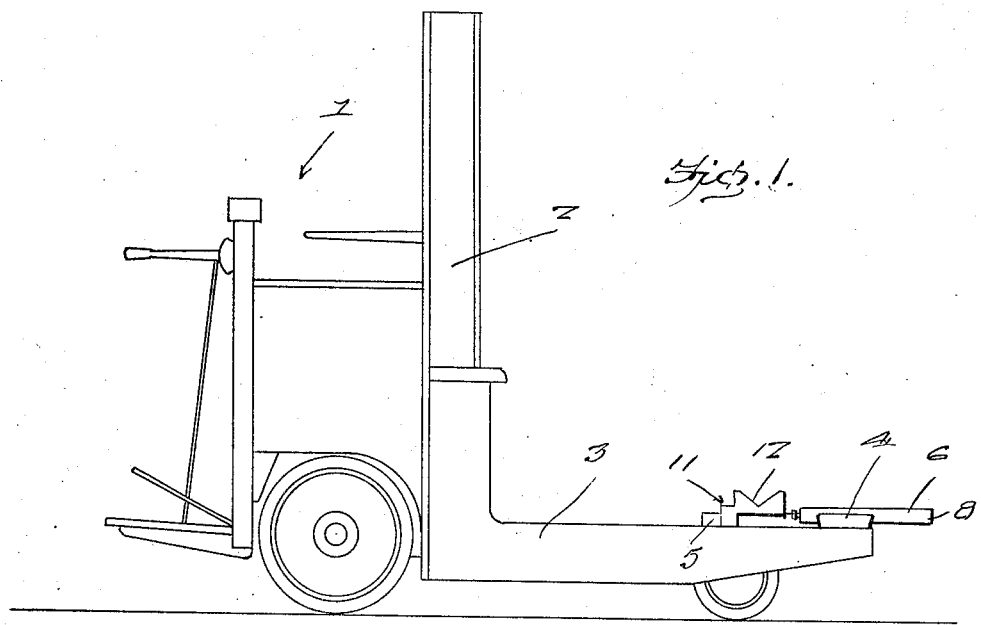
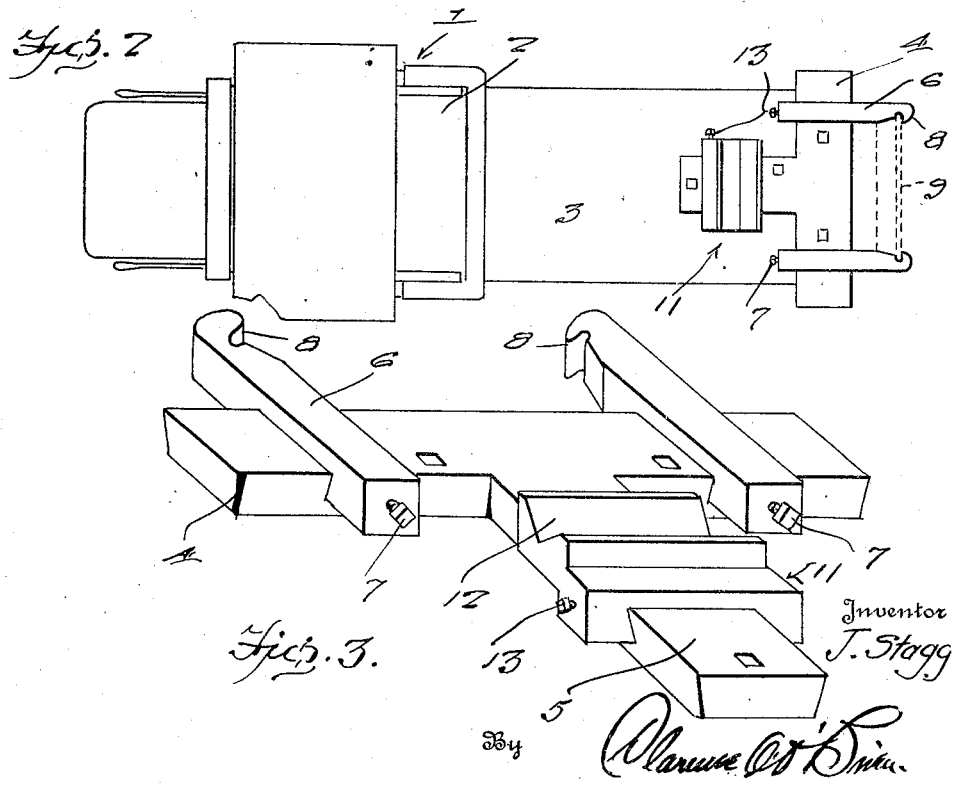
Inventor
J. Stagg
By Clarence O'Brien
Attorney Patented Apr. 13, 1926.

1,580,698

UNITED STATES PATENT OFFICE.

JOEL STAGG, OF ST. THOMAS, ONTARIO, CANADA.

CAR-WHEEL-CONVEYING TRUCK.

Application filed May 28, 1925. Serial No. 33,417.

*To all whom it may concern:*

Be it known that I, JOEL STAGG, a citizen of Canada, residing at St. Thomas, in the Province of Ontario and Dominion of Canada, have invented certain new and useful Improvements in Car-Wheel-Conveying Trucks, of which the following is a specification.

This invention relates to an improved elevating platform truck, adapted for hoisting the wheel base of a railway car or the like, to be jacked up and to permit removal or replacement of the flanged track engaging wheels.

More particularly however, the invention has specific reference to an attachment for the platform of a conventional elevating platform truck, and the object is to provide a means for more conveniently carrying the wheels.

The attachment is such that it is adapted for carrying a single wheel detached from its supporting axle, or to carry the complete unit comprising the axle, with a pair of wheels on the opposite ends.

Other specific features and advantages of the improved attachment will become apparent from the following description and drawings.

In the accompanying drawing, forming a part of this application, and in which like numerals are employed to designate like parts throughout the same:

Figure 1 is a side view of a platform elevating truck, with the platform equipped with an attachment embodying the features of the invention.

Figure 2 is a top plan view of Figure 1.

Figure 3 is an enlarged detail perspective view of the attachment itself.

Referring to the drawing in detail, the reference character 1 designates generally a truck which embodies, among other features, an appropriate motor, preferably an electric motor, steering means, and a wheel supported base. Rising from the base is a standard 2, embodying suitable means (not shown) for hoisting a platform 3, normally resting on the wheel supported base. Trucks of this general type are quite common in car repair shops and the like.

As before intimated, the novelty of the present invention resides more particularly in the provision of means which is attached to the elevating platform for conveying the car wheels and axle. The means preferably comprises a cross plate 4, which is bolted or otherwise rigidly fastened to the upper side of the platform, adjacent the rear end thereof. Extending from the center of this plate, in a forward direction is an extension 5, which is likewise bolted in place. In this connection, I would direct attention to the fact that the edges of these parts are bevelled, as indicated, for a purpose to be hereinafter made clear. A pair of wheel grips 6 are slidably mounted upon the plate 4. These grips are in the form of bars and have their under faces notched for reception of the upper half of the cross plate. The ends of the notches are undercut, to cooperate with the co-acting bevelled edges on said plate. For retaining these grips in various set positions, set screws 7 are carried by the forward ends. The opposite ends are notched, and shaped, as indicated at 8, to provide hooks adapted to engage the flange of the wheel 9, as indicated in dotted lines in Figure 2. It should be observed that the portions of the grips, adjacent the hooks are beveled somewhat as indicated to accommodate the bevelled periphery of the wheel. Slidably mounted upon the extension 5 is a block 11, the underside of which is provided with a channel fitting upon the extension 5. The walls of the channel are bevelled, for cooperation with the bevelled edges of the extension. These co-acting bevelled faces serve to prevent accidental displacement of the parts from the undue weight which is exerted thereon. It should be noted that the block 11 is increased in thickness at one end, and this thickened portion is provided with a substantially V-shaped groove 12, constituting an axle seat. A set screw 13 is carried by the sliding block for the purpose of holding it in various adjusted positions.

In practice, the device is securely fastened upon the upper side of the platform 3 in the approximate positions shown in Figures 1 and 2. With the device thus arranged, the truck can be driven so that the platform is disposed beneath the wheel base of the car. Now, the platform can be raised to bring the seat 12 up, and under the axle. With the car properly jacked up, the wheels and axle, as a unit, can be released, and the axle permitted to extend into the seat. Then, the platform can be lowered in place and the truck driven off and the wheel and axle unit carried to the desired destination. Obviously, this does away with the expensive practice of utilizing a number of men for doing the same work. Therefore, the advantage of a device of this kind will be duly appreciated and understood by those skilled in the art to which the invention relates. For this reason, a more lengthy description of the invention is thought to be unnecessary.

While the preferred embodiment of the invention has been shown and described, it is to be understood that minor changes coming within the field of invention claimed may be resorted to if desired.

I claim:

1. A new article of manufacture, an attachment for a truck comprising a plate adapted to extend crosswise of the bottom of the truck and having a central longitudinal extension projecting from the center of the forward longitudinal edge, certain edges of said extension and plate being bevelled, a pair of bars extending crosswise of said plate and notched in their under sides for reception of the upper portion of the plate, the end walls of the notches being undercut for cooperation with the bevelled edges, set screws carried by the forward ends of said bars, the opposite ends of the bars being formed with hooks adapted to engage the flange of a car wheel, a grooved block slidable upon said extension, said block having a portion formed with a substantially V-shaped groove forming a seat for reception of a wheel axle.

2. As a new article of manufacture, an attachment for a truck wherein the truck comprises a wheel supported base, an elevating platform associated therewith, said attachment comprising an attaching plate adapted to extend transversely across the bottom of the truck and having a central extension projecting from one longitudinal edge, a pair of wheel gripping members adjustably mounted on said plate and extending at right angles therefrom, and a grooved block slidably mounted upon said extension, said block being formed with a substantially V-shaped axle seat.

In testimony whereof I affix my signature.

JOEL STAGG.